(12) United States Patent
Imhoff et al.

(10) Patent No.: US 11,733,390 B2
(45) Date of Patent: Aug. 22, 2023

(54) ARCHITECTURE FOR INCREASED MULTILATERATION POSITION RESOLUTION

(71) Applicant: Raytheon Company, Waltham, MA (US)

(72) Inventors: Scott Allen Imhoff, Parker, CO (US); Marcus Alton Teter, Belgrade, MT (US)

(73) Assignee: Raytheon Company, Waltham, MA (US)

( * ) Notice: Subject to any disclaimer, the term of this patent is extended or adjusted under 35 U.S.C. 154(b) by 170 days.

(21) Appl. No.: 17/398,717

(22) Filed: Aug. 10, 2021

(65) Prior Publication Data

US 2023/0046944 A1 Feb. 16, 2023

(51) Int. Cl.
   *G01S 19/23* (2010.01)
   *G01S 19/35* (2010.01)
(52) U.S. Cl.
   CPC .............. *G01S 19/23* (2013.01); *G01S 19/35* (2013.01)
(58) Field of Classification Search
   CPC .................................. G01S 19/23; G01S 19/35
   See application file for complete search history.

(56) References Cited

U.S. PATENT DOCUMENTS

| | | | |
|---|---|---|---|
| 4,511,219 A | 4/1985 | Giles et al. | |
| 5,481,269 A | 1/1996 | Imhoff et al. | |
| 6,839,698 B2 | 1/2005 | Nguyen et al. | |
| 10,726,738 B1* | 7/2020 | Li | A63B 71/06 |
| 11,402,542 B2* | 8/2022 | Rothenberg | G06N 20/20 |
| 2011/0106442 A1 | 5/2011 | Desai et al. | |
| 2014/0278336 A1* | 9/2014 | Kozloski | G06F 30/20 703/22 |
| 2018/0156920 A1* | 6/2018 | Diggelen | G01C 21/16 |
| 2019/0201075 A1* | 7/2019 | Shelton, IV | A61B 17/072 |
| 2019/0228256 A1 | 7/2019 | Teter et al. | |
| 2019/0245564 A1 | 8/2019 | Imhoff et al. | |

OTHER PUBLICATIONS

"U.S. Appl. No. 16/251,819, Non Final Office Action dated Jun. 7, 2022", 7 pgs.
"U.S. Appl. No. 16/251,819, Notice of Allowance dated Sep. 7, 2022", 8 pgs.
"U.S. Appl. No. 16/251,819, Response filed Aug. 19, 2022 to Non Final Office Action dated Jun. 7, 2022", 9 pgs.

(Continued)

*Primary Examiner* — Ankur Jain
(74) *Attorney, Agent, or Firm* — Schwegman Lundberg & Woessner, P.A.

(57) ABSTRACT

Systems, devices, methods, and computer-readable media for improved location determination of an orbiting device. A method can include receiving, at a transceiver of a device, measurement data from a monitor device, the measurement data representative of a physical state of a mobile object, filtering, using a first of a plurality of first filters of the device, the measurement data based on a character parameter of a state transition matrix representative of the physical state resulting in filtered measurement data, filtering, using a Kalman filter, the filtered measurement data resulting in further filtered measurement data, and providing, by the transceiver, the further filtered measurement data.

20 Claims, 5 Drawing Sheets

(56) References Cited

OTHER PUBLICATIONS

"U.S. Appl. No. 16/270,559, Examiner Interview Summary dated Jul. 5, 2022", 2 pgs.
"U.S. Appl. No. 16/270,559, Non Final Office Action dated Apr. 15, 2022", 6 pgs.
"U.S. Appl. No. 16/270,559, Notice of Allowance dated Sep. 9, 2022", 10 pgs.
"U.S. Appl. No. 16/270,559, Response filed Jul. 15, 2022 to Non Final Office Action dated Apr. 15, 2022", 7 pgs.
U.S. Appl. No. 16/251,819, filed Jan. 18, 2019, Learning Automaton and Low-Pass Filter Having a Pass Band That Widens Over Time.
U.S. Appl. No. 16/270,559, filed Feb. 7, 2019, Preprocessor for Device Navigation.
Jaenisch, Holger, "Data Modeling enabled guidance, navigation, and control to enhance he lethality of interceptors against maneuvering targets", Proceedings of SPIE—The International Society for Optical Engineering, (2005), 12 pgs.
Jaenisch, Holger, "Data Modeling for Nonlinear Track Prediction of Targets through Obscurations", Proceedings of SPIE—The International Society for Optical Engineering, (2012), 23 pgs.
Jaenisch, Holger, "Spatial Voting with Data Modeling for Behavior Based Tracking and Discrimination of Human from Fauna from GMTI Radar Tracks", Proceedings of SPIE—The International Society for Optical Engineering, (2012), 16 pgs.
Jaenisch, Holger, et al., "Virtual Instrument Prototyping with Data Modeling", Thesis paper, (2009), 15 pgs.
Klir, George, et al., "Fuzzy Automata", Fuzzy Sets and Fuzzy Logic: Theory and Applications, Prentice-Hall, (1995), 349-352.
Revesz, G, "Automata and Their Languages", Introduction to Formal Languages, pp. 59-88, McGraw-Hill Book Company, (1983), 38 pgs.

\* cited by examiner

ARCHITECTURE FOR INCREASED MULTILATERATION POSITION RESOLUTION

BACKGROUND

Position accuracy can be quite important. Consider that, a 1 nanosecond inaccuracy in a time used to determine a position of a satellite can result in a position error of about a foot. Increasing the position accuracy can be quite difficult due to the time constraints, as well as the complexity in orbital mechanics. Prior work on increasing navigation accuracy includes smoothing (a type of averaging) the measurement data.

DETAILED DESCRIPTION

Figure 1:
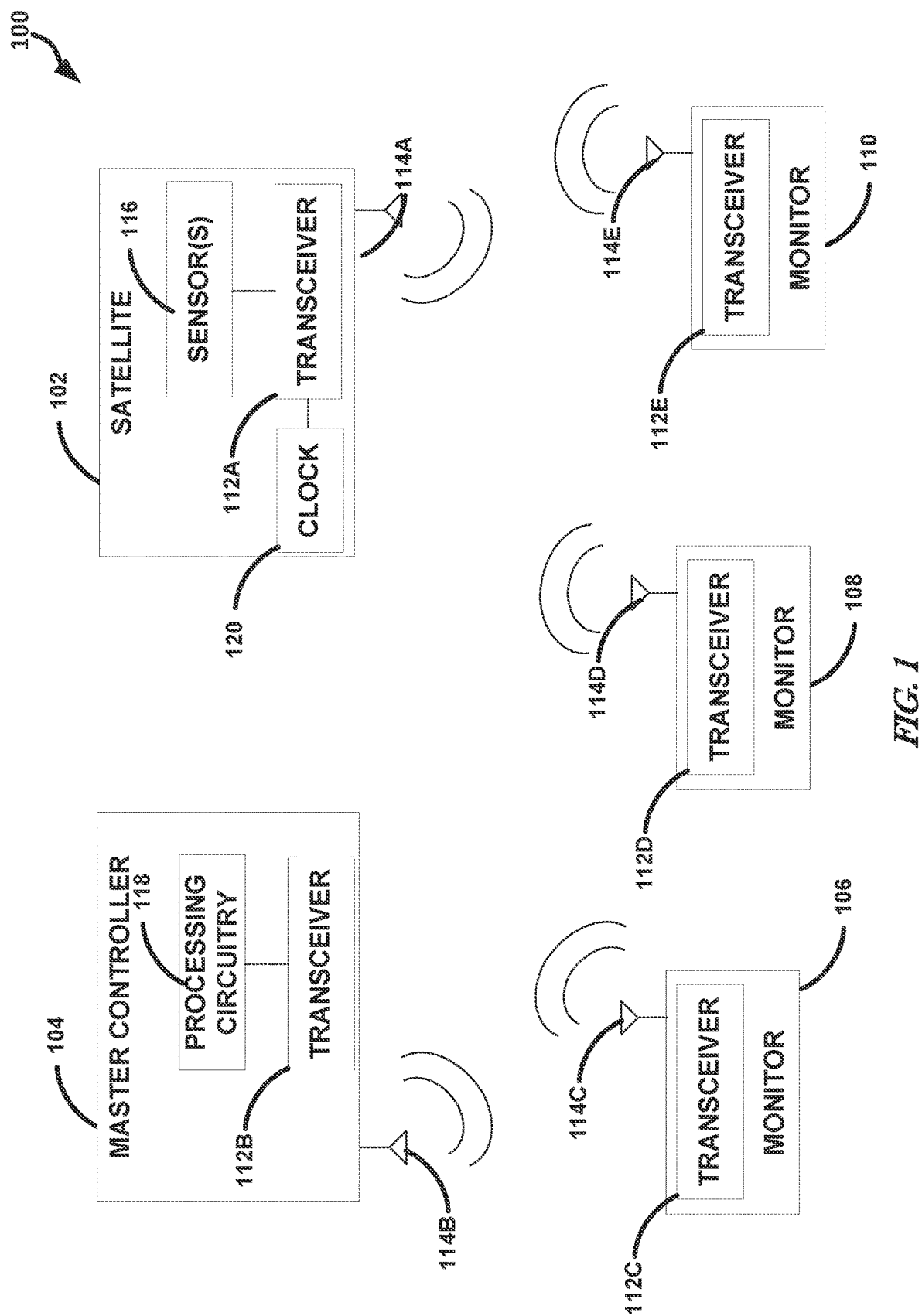
FIG. 1 illustrates, by way of example, a diagram of an embodiment of a system for satellite position determination.

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Multilateration is a technique for determining a position of a device based on measurement of times of arrival (TOAs) of energy waves from system stations, typically satellites. Multilateration is sometimes called hyperbolic positioning. The stations can be mobile and multilateration relies on the position of the stations. Multilateration can benefit from improved accuracy of the position, in space, of the stations.

For satellite position determination in multilateration, the orbital position, or ephemeris, of the satellites can be precisely determined. The orientation of the Earth plays an important role in determining the position of the satellite. The orientation of the Earth in space is constantly changing. The Earth wobbles as it rotates due to the gravitation pull (tides) of the moon, sun, and other celestial objects. Even shifts in air and ocean currents and motions in Earth's molten core can influence Earth's orientation. Models of the Earth's orientation are inaccurate due, at least in part, to these shifts and wobbles. Thus, a model of satellite navigation that relies on the model of Earth's orientation also tends to be inaccurate. Embodiments help increase the accuracy of satellite position determination.

Embodiments can help solve the problem of achieving centimeter accuracy for knowing the position in space of a multilateration satellite. This represents an order-of-magnitude improvement in positioning accuracy. The improvement in knowledge of multilateration space vehicle position leads directly to a similar improvement in the positioning capability for a user on the ground, depending on user equipment. The ±.5 cm accuracy at the space vehicle enables centimeter-type accuracy for the user, depending on user equipment.

Embodiments are designed to enhance positioning accuracy of global navigation, but have other applications. Embodiments can include a pre-filter to a Kalman filter. The pre-filter can reduce a covariance of measurement data input to the Kalman filter. This reduction in covariance provides a global navigation constellation system improved precision in the knowledge of position of space vehicles. This in turn creates the capability for space vehicles to transmit to a user, navigation messages conveying more precise positioning and timing data. A result is availability of greater positioning accuracy for users on or near the Earth. This improved accuracy can aid many missions, including safety-of-life applications.

The machine learning (ML) used by embodiments can use its own learned state to influence its output. After an episode of learning, embodiments can select a filtering by direct self-analysis of internals of its learned state machine (state transition matrix). Effectively, the output of the ML includes not only the residue fine structure of a device orbit, but also the learned machine itself.

FIG. 1 illustrates, by way of example, a diagram of an embodiment of a system 100 for satellite position determination. The system 100 includes a satellite 102, a master controller 104, and a plurality of monitors 106, 108, and 110. While embodiments are described with regard to satellite position determination, embodiments are applicable to measurements, such as position determination of associated celestial objects.

The satellite 102 can include a communication, remote sensing (e.g., weather, electromagnetic sensing, radar, lidar, or the like), navigation (e.g., global positioning system (GPS), Galileo, or the like), internet, radio, television, manned, unmanned, or other satellite. The satellite 102 is generally any device capable of communication with the monitor 106, 108, 110. The satellite 102 can be orbiting the Earth, whether in low Earth orbit (LEO), medium Earth orbit (MEO), or high Earth orbit (HEO).

The satellite 102 as illustrated includes sensor(s) 116, a transceiver 112A, and an antenna 114A. The transceiver 112A is a receive and transmit radio. The transceiver 112A receives electrical signals transduced by the antenna 114A. The transceiver 112A can demodulate data from such signals. The transceiver 112A can modulate data onto electrical signals. The antenna 114A can convert the modulated electrical signals to an electromagnetic wave that is transmitted to the monitor 106, 108, 110. The data modulated onto the wave can include Keplerian element data, as determined by the sensor(s) 116, or a time as provided by a clock 120. The clock 120 of a satellite 102 is often an atomic clock with a very high time accuracy (e.g., with a maximum drift of about 2 nanoseconds a year). The sensor(s) 116 can include electro optical sensor(s) (e.g., visible, infrared (IR), or other electromagnetic radiation frequency sensor), three-axis accelerometer, gyroscope, temperature, weather, laser altimeter, lidar, radar, ranging instrument, scatterometer, sounder, radiometer, spectrometer, spectroradiometer, or the like.

Locations of satellites 102 can be determined using tracking from monitors 106, 108, 110. The monitors 106, 108, 1110 use mechanisms such as radar, signal Doppler, and laser reflectors or measurement of time delay in a time-tagged signal received passively to pinpoint the position of a satellite and to maintain an understanding of its orbital elements. Given Keplerian orbital elements, orbital mechanics can be used to calculate where the satellite 102 is at a specific point in time. The Keplerian elements are: epoch time that indicates the time at which the other values, inclination that indicates the angle between the equator and the orbit plane, eccentricity which is a constant defining the shape of the orbit (e.g., 0=circular, <1=elliptical), length of semi-major axis that is a constant defining the size of the orbit, true anomaly which indicates the angle between perigee and the satellite 102 (in the orbit plane), right ascension of the ascending node, the angle between vernal equinox and the point where the orbit crosses the equatorial plane (going north), and argument of perigee that indicates the angle between the ascending node and the orbit's point of closest approach to the earth (perigee). This information can be tabulated in an ephemeris (a table). Given the Keplerian elements and a time stamp from the satellite 102, the monitor 106, 108, 110 can calculate the position of the satellite 102.

Additionally, or alternatively, trilateration can be used by the master controller 104 to determine the position of the satellite 102. Each of the monitors 106, 108, 110 can each receive a communication from the satellite 102. A time between the transmission of communication at the satellite and reception of the communication at the monitors 106, 108, 110 can indicate how far away the satellite 102 is from the monitors 106, 108, 110. The distance to each of the monitors 106, 108, 110 can be used to determine the position of the satellite 102. This determination tends to be more accurate than the determination using the Keplerian elements.

The monitors 106, 108, 110 as illustrated include respective transceivers 112C, 112D, and 112E and respective antennas 114C, 114D, and 114E. The transceivers 112C-112E modulate data to be provided to the master controller 104 and receive electrical signals from the satellite 102. The data to the master controller 104 can include a time between transmission of a communication from the satellite 102 and reception of the communication at the monitor 110. The data to the master controller 104 can further include sensor data from the satellite 102.

The master controller 104 as illustrated includes the transceiver 112B, the antenna 114B, and processing circuitry 118. The transceiver 112B demodulates electromagnetic waves from the monitors 106, 108, 110. The processing circuitry 118 performs operations on the received data (and other data) to determine position correction information for the satellite 102. The processing circuitry 118 can include electrical components configured to perform the operations on the received data. The processing circuitry 118 can include one or more resistors, transistors, capacitors, diodes, inductors, logic gates (e.g., AND, OR, XOR, negate, buffer, or the like), regulators (e.g., voltage, current, or power), amplifiers, power supplies, analog to digital converters, digital to analog converters, multiplexers, switches, buck or boost converters, or the like. The processing circuitry 118 can include a central processing unit, such as can include one or more central processing units (CPUs), graphics processing units (GPUs), field programmable gate arrays (FPGAs), application specific integrated circuits (ASICs), or the like.

Two or more of the processing units can operate in different number systems, such as in parallel.

The master controller 104 acts as a data processing center for information collected at the monitors 106, 108, 110. Orbit coordinates can be determined by trilateration and the orbit model (ephemeris). When the satellite drifts out of expected orbit, repositioning can be undertaken. The clocks may also be readjusted, but more usually information on time errors is attached to signals as correction factors. The computed corrections, time readjustments and repositioning information can be transmitted to the satellite via an uplink from the monitor 106, 108, 110.

Figure 2:
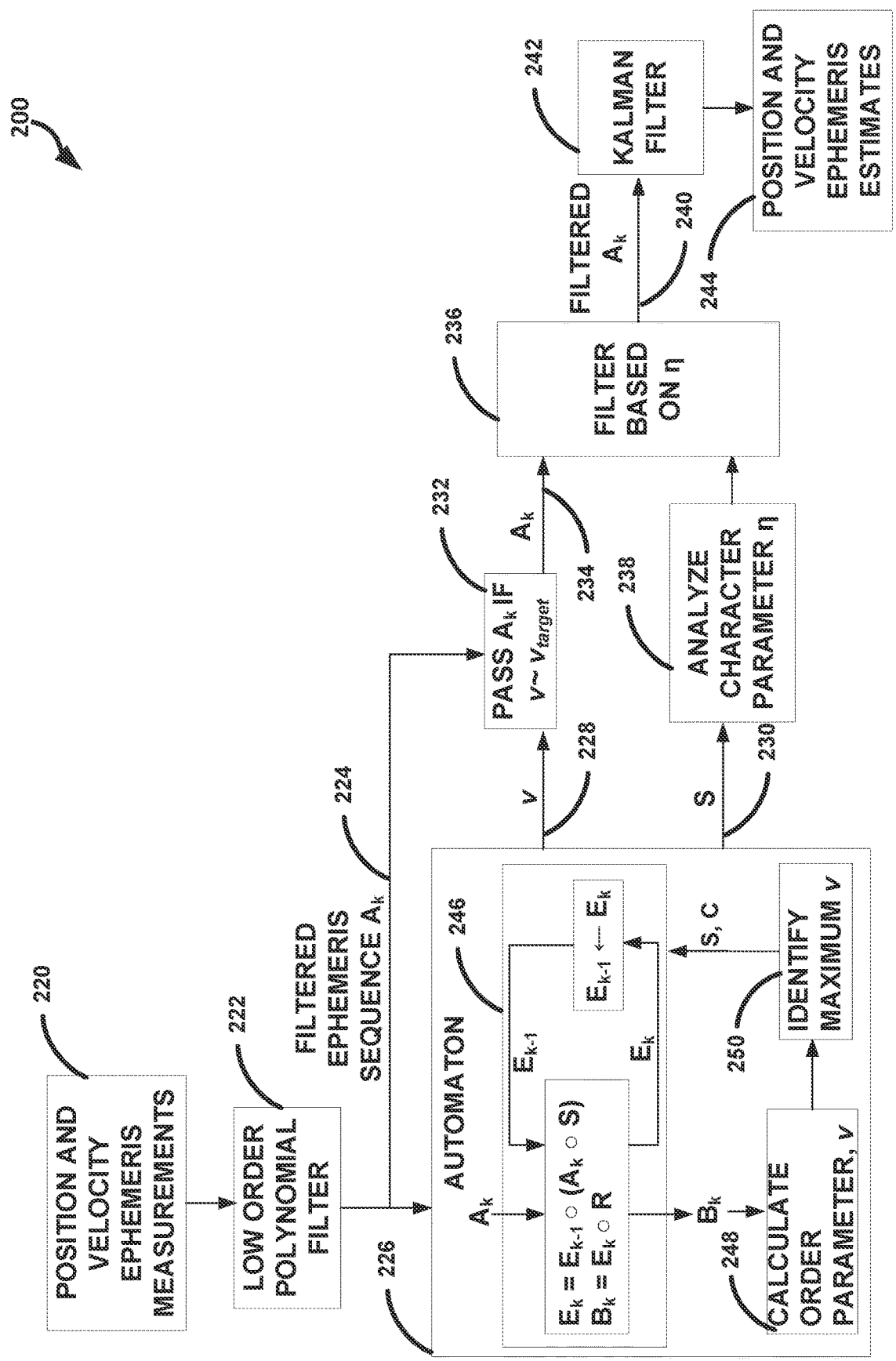
FIG. 2 illustrates, by way of example, a diagram of an embodiment of a system for improving satellite position determination.

FIG. 2 illustrates, by way of example, a diagram of an embodiment of a system 200 for improving satellite position determination. In the system 200, position and velocity ephemeris measurements 220 are provided as input to a low order polynomial filter 222. The low order polynomial filter can help reduce an amount of learning (number of iterations to convergence) that is performed by an automaton 226. The low order polynomial filter 222 effectively removes excursions in the ephemeris measurements 220 to generate filtered ephemeris sequence $A_k$ 224. The order of a filter can be much less than the number of input samples used to perform a filter operation minus one. The higher the order of a filter, the faster a roll off rate of the filter. The low order polynomial filter 222 can be a weak convergence polynomial. A low order weak convergence polynomial filter can be naïve in that it removes major amplitude excursions without presupposing the location in frequency of the deterministic content. The low order polynomial filter 222 can remove (subtract off) a majority of deterministic content of the measurement data 220 so that the automaton 226 spends less time finding convergence in the deterministic content.

Weak convergence is now explained. If $L^2$ is a Hilbert Space that is characterized by having a scalar, or inner, product defined as $\langle f, g \rangle = \int f(x)\overline{g(x)}\, dx$ where $\overline{g(x)}$ is a complex conjugate of a function g(x). Weak convergence is intimately connected to an inner product space. A sequence of vectors $\{x_n\}$ in an inner product space V weakly convergent to the vector $\{x\}$ in V if:

$$\langle x_n, y \rangle = \langle x, y \rangle \text{ as } n \to \infty f \text{ or all } y \in V$$

Suppose that is a collection of measurements $y_1, y_2 \ldots y_n$ taken at times $t_1, t_2 \ldots t_n$, respectively. The measurements and times can be organized in ordered pairs $(t_1, y_1)$, $(t_2, y_2), \ldots, (t_n, y_n)$ to which a polynomial fit may be considered. Suppose an order of fit of 2 is considered. The, it is desired to find a, b, and c such that $y = at^2 + bt + c = y$. To find a, b, and c, the following matrix system can be solved:

$$\begin{bmatrix} \sum_{n=1}^{N} t_n^2 & \sum_{n=1}^{N} t_n & N \\ \sum_{n=1}^{N} t_n^3 & \sum_{n=1}^{N} t_n^2 & \sum_{n=1}^{N} t_n \\ \sum_{n=1}^{N} t_n^4 & \sum_{n=1}^{N} t_n^3 & \sum_{n=1}^{N} t_n^2 \end{bmatrix} \begin{bmatrix} a \\ b \\ c \end{bmatrix} = \begin{bmatrix} \sum_{n=1}^{N} y_n \\ \sum_{n=1}^{N} t_n y_n \\ \sum_{n=1}^{N} t_n^2 y_n \end{bmatrix}$$

The automaton 226 performs fuzzy learning operations 246 to learn state transition matrix, S, and a measure of order, v, in $A_k$ 224. The fuzzy learning operations 246 can include receiving $A_k$, $E_k$, an automaton state, and R, a response from entering a state. A symbol ○ represents an aggregation operator. The fuzzy learning operations 246 produce $B_k$, an automaton 226 output signal that can be used to determine order parameter, v.

The aggregation operator replaces, in a typical matrix multiplication technique, multiplication with a minimum operator and summation with a maximum operator. The following provides an example of normal matrix multiplication operation.

$$[1 \; 0.8 \; 0.6] \times \begin{bmatrix} 0 & 0.4 & 0.4 \\ 0.3 & 1 & 0 \\ 0.5 & 0 & 0 \end{bmatrix} = [sum\{1 \times 0, 0.8 \times 0.3, 0.6 \times 0.5\} sum$$

$$\{1 \times 0.4, 0.8 \times 1, 0.6 \times 0\} sum\{1 \times 0.4, 0.8 \times 0, 0.6 \times 0\}] = [0.54 \; 1.2 \; 0.4]$$

What follows provides an example of the aggregation operation.

$$[1 \; 0.8 \; 0.6] \cdot \begin{bmatrix} 0 & 0.4 & 0.4 \\ 0.3 & 1 & 0 \\ 0.5 & 0 & 0 \end{bmatrix} =$$

$$\begin{bmatrix} \max\{\min(1, 0), \min(0.8, 0.3), \min(0.6, 0.5)\} \max\{\min(1, 0.4), \min(0.8, 1), \min(0.6, 0)\} \\ \max\{\min(1, 0.4), \min(0.8, 0), \min(0.6, 0)\} \end{bmatrix} =$$

$$[0.5 \; 0.8 \; 0.4]$$

What follows is a simple example of processing $A_k$ using the fuzzy learning operations 246. Two consecutive operations are shown with superscripts indicating order of input, thus a superscript "1" indicates a first input and "2" indicates a next consecutive input after the input corresponding to the "1".

$$A^1 = [1 \; .4]$$

$$S_A^1 = \begin{bmatrix} 0 & .4 & .4 & 1 \\ .3 & 1 & 0 & .4 \\ .5 & 0 & 0 & 1 \\ .4 & .3 & 0 & 1 \end{bmatrix}$$

$$E^1 = C \cdot S_A^1 = [1 \; .8 \; .6 \; .4] \cdot \begin{bmatrix} 0 & .4 & .4 & 1 \\ .3 & 1 & 0 & .4 \\ .5 & 0 & 0 & 1 \\ .4 & .3 & 0 & 1 \end{bmatrix} = [.5 \; .8 \; .4 \; 1]$$

$$B^1 = E^1 \cdot R = [.5 \; .8 \; .4 \; 1] \cdot \begin{bmatrix} 1 & 0 & 0 \\ 0 & 1 & 0 \\ 0 & 0 & 1 \\ .5 & 1 & .3 \end{bmatrix} = [.5 \; 1 \; 4]$$

$$A^2 = [0 \; 1]$$

$$S_A^2 = \begin{bmatrix} 0 & 0 & 1 & 0 \\ .2 & 0 & 0 & 1 \\ 0 & 0 & 0 & 1 \\ 1 & .3 & 0 & .6 \end{bmatrix}$$

$$E^2 = E^1 \cdot S_A^2 = [.5 \; .8 \; .4 \; 1] \cdot \begin{bmatrix} 0 & 0 & 1 & 0 \\ .2 & 0 & 0 & 1 \\ 0 & 0 & 0 & 1 \\ 1 & .3 & 0 & .6 \end{bmatrix} = [1 \; .3 \; .5 \; .8]$$

$$B^2 = E^2 \cdot R = [1 \; .3 \; .5 \; .8] \cdot \begin{bmatrix} 1 & 0 & 0 \\ 0 & 1 & 0 \\ 0 & 0 & 1 \\ .5 & 1 & .3 \end{bmatrix} = [1 \; .8 \; .5]$$

At operation 248, the order parameter, v, can be determined. Equation 1 provides an example calculation of the order parameter, v.

$$v = \Sigma_{i,j} \int_{t_0}^{t_0+T} B_k(t) dt \quad \text{Equation 1}$$

The order parameter, v 228, measures success of the automaton 226 in finding order within $A_k$ 224. After the order parameter has reached a specified level (within a threshold amount of $v_{target}$) the state transition matrix, S 230, can be used to determine the character parameter, η, and decide how to filter $A_k$ 224.

For fuzzy automata, like the automaton 226, a size of the state transition matrix, S 230, can be made arbitrarily large, such as to facilitate learning. The size of S 230 can be independent of the inputs and outputs of the automaton 226. A larger number of state transitions in the automaton 226 is akin to more layers in a neural network (NN).

At operation 250, a maximum v 228 can be identified. The maximum v 228 can be determined over a number of iterations of determining v. In each iteration, the state transition matrix, S, and an initial state matrix, C, can be varied using pseudorandom numbers, for example. A size of the matrix, S, and initial state matrix, C, can be adjusted pseudo randomly at each iteration. The size of S and C can vary between consecutive learning sessions (changing the output, S and v. When the automaton 226 converges (when a parameter, η, changes less than a specified percentage between consecutive iterations or a specified amount between consecutive iterations) the state transition matrix, S 230, and v 228 can be output by the automaton 226. At operation 232, $A_k$ can be passed to a filter 236 if v 228 is exhibiting convergence, such as showing less than two, or a greater or lesser, percent increase over several learning iterations.

v is both a detector of generative grammar and a measure of generative grammar in $B_k$. The fuzzy learning automaton detects an order which is language like, resulting in an order parameter parameter, v, which is larger when deterministic content is found in $B_k$. A fuzzy genetic learning automata can be used as the basis of learning, rather than neural networks, because the global navigation problem in general has language like characteristics, such as when the GNSS satellites repeatedly go in and out of eclipse, revisit the same gravitational potentials, experience episodes of space weather, etc.

At operation 238, a character parameter, η, can be determined based on S. η can be defined as in Equation 2:

$$\eta = 2*(\text{trace}-\text{antitrace})/(\text{trace}+\text{antitrace}) \quad \text{Equation 2}$$

A trace is a sum of the diagonal entries of a square (or hyper) matrix moving from left to right (starting in an upper left corner of the matrix and moving to a lower right corner of the matrix). An antitrace is a sum of the diagonal entries of a square (or hyper) matrix moving from right to left (starting in an upper right corner of the matrix and moving to a lower left corner of the matrix).

The filter 236 can determine which of three ranges of values the character parameter, η, falls into. For η<−0.25 the filter 236 can low pass filter $A_k$ 234. For −0.25≤η≤0.25 the filter 236 can apply a wavelet filter to $A_k$ 234. For η0.25, the filter 236 can apply a moving average filter to $A_k$ 234.

The result of the filter 236 is a filtered $A_k$ 240. The filtered $A_k$ 240 can be provided to a Kalman filter 242. The Kalman filter 242 can produce accurate position and velocity ephemeris estimates 244.

When the Kalman filter 242 receives filtered $A_k$ 240, it gains highly accurate positional data. A device that relies on the positional data to determine its own location, thus gains improved accuracy in determining its own position as well.

Kalman filters used for navigation can determine a weighted average of two sources of information for the location of a device: 1) measurement data based on the device's locations from monitor stations 106, 108, 110 and 2) data from an analytical model which attempts to predict the device's location. The Kalman gain determines this weighting. If a covariance of the measurement data is low, the Kalman filter relies, through the weighting, more on the measurement data than on the location model. Relying on the measurement data can be preferred since it can result in better position, velocity and timing accuracy (PVTA) as compared to reliance on the model.

Embodiments can include a preprocessor for the measurement data, which can cause the covariance of the measurement data to be lower and thus cause the Kalman filter to rely more on the measurement data (weight the measurement data higher than data from the model). Embodiments can preprocess the measurement data using a fuzzy genetic learning automata. This can result in better PVTA.

Embodiments can use fuzzy learning to preprocess the measurement data being fed to the Kalman filter. Embodiments can refrain from relying on smoothing. With fuzzy learning automata, candidate measurement values graduate through state transitions and are presented as better replacement alternatives for data which is problematic (e.g., associated with a higher covariance).

The fuzzy genetic learning automata preprocessor of embodiments can include a learning phase and a working phase. In the learning phase the automata can learn the patterns occurring in the measurement data. The automata can capture the patterns stemming from periodic aspects of what the device is experiencing: going in and out of eclipse, through variations in gravitational potential, etc. The learning automata can learn these patterns through genetic learning and capture them as allowed fuzzy state transitions represented in hypermatrices $S_1$, $S_2$, . . . . In the working phase, the preprocessor can provide outputs $B_1$, $B_2$, . . . , $B_N$ which can, when needed, replace measurement data, such as when doing so reduces the covariance. The preprocessor can drive the covariance lower so that 1) more weight is placed on the measurement data and 2) better measurement data is ingested by the Kalman filter. This is conducive to better PVTA.

Embodiments generally do not modify or improve the Kalman filter. Rather, embodiments provide the Kalman filter with better measurement data with the expectation that this will allow the Kalman filter to more accurately predict PVTA. Embodiments provide an improvement that can be devoid of any kind of averaging. Instead, actual candidate measurement values graduate through state transitions and are presented as better replacement alternatives for data which has a problem or is associated with a high covariance. One or more embodiments provide an ability to predict measurements and can supply useful, accurate measurements when there are measurement data dropouts or measurement data is otherwise not available or has high covariance.

Figure 3:
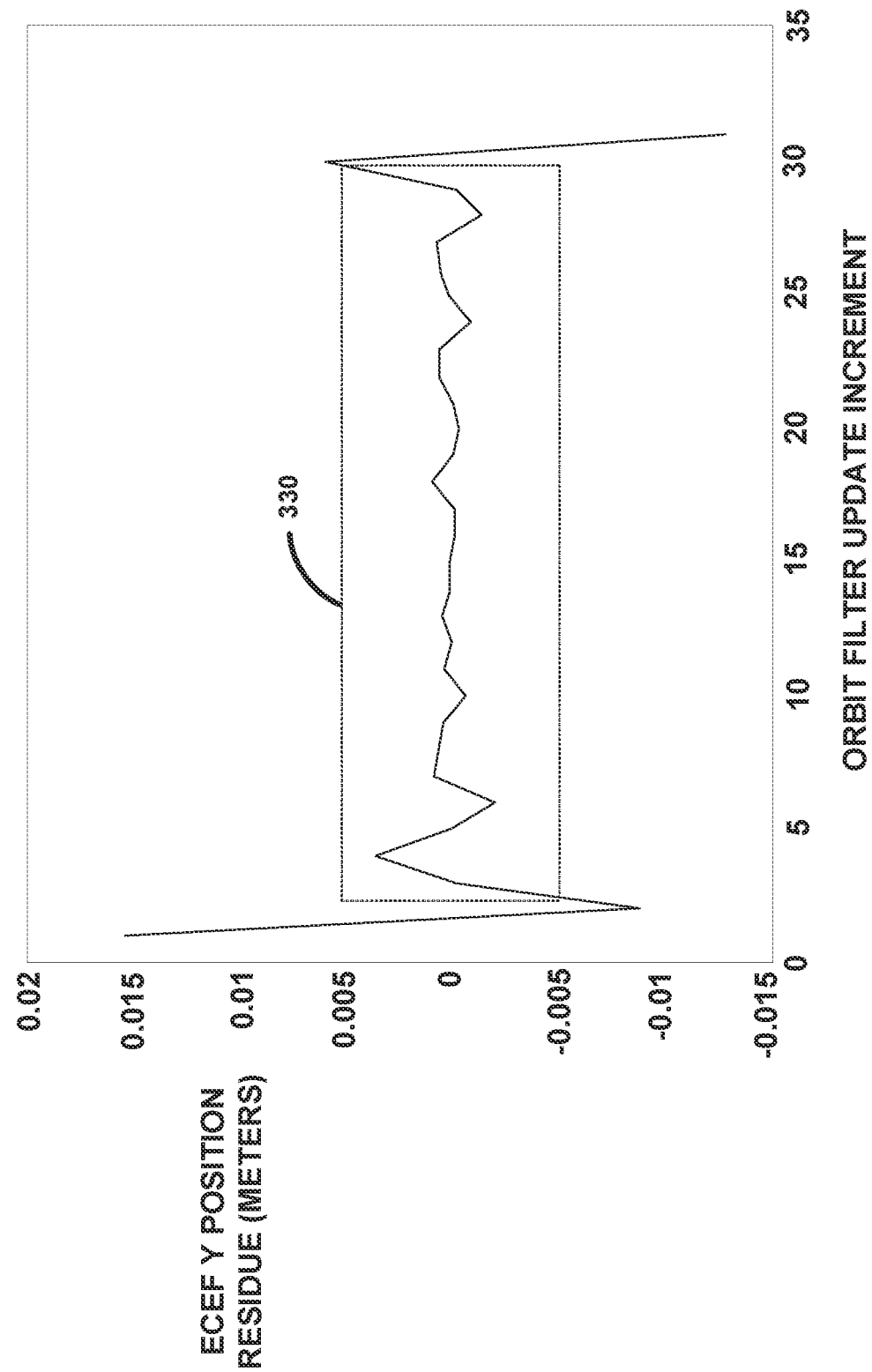
FIG. 3 illustrates, by way of example, a graph of Earth-centered, Earth-fixed (ECEF) y-position residue versus orbit filter update increment.

FIG. 3 illustrates, by way of example, a graph of Earth-centered, Earth-fixed (ECEF) y-position residue versus orbit filter update increment. As can be seen, for about 90% of orbit filter update increments (a range within dashed box 330), y-position residue is within a half a centimeter.

Figure 4:
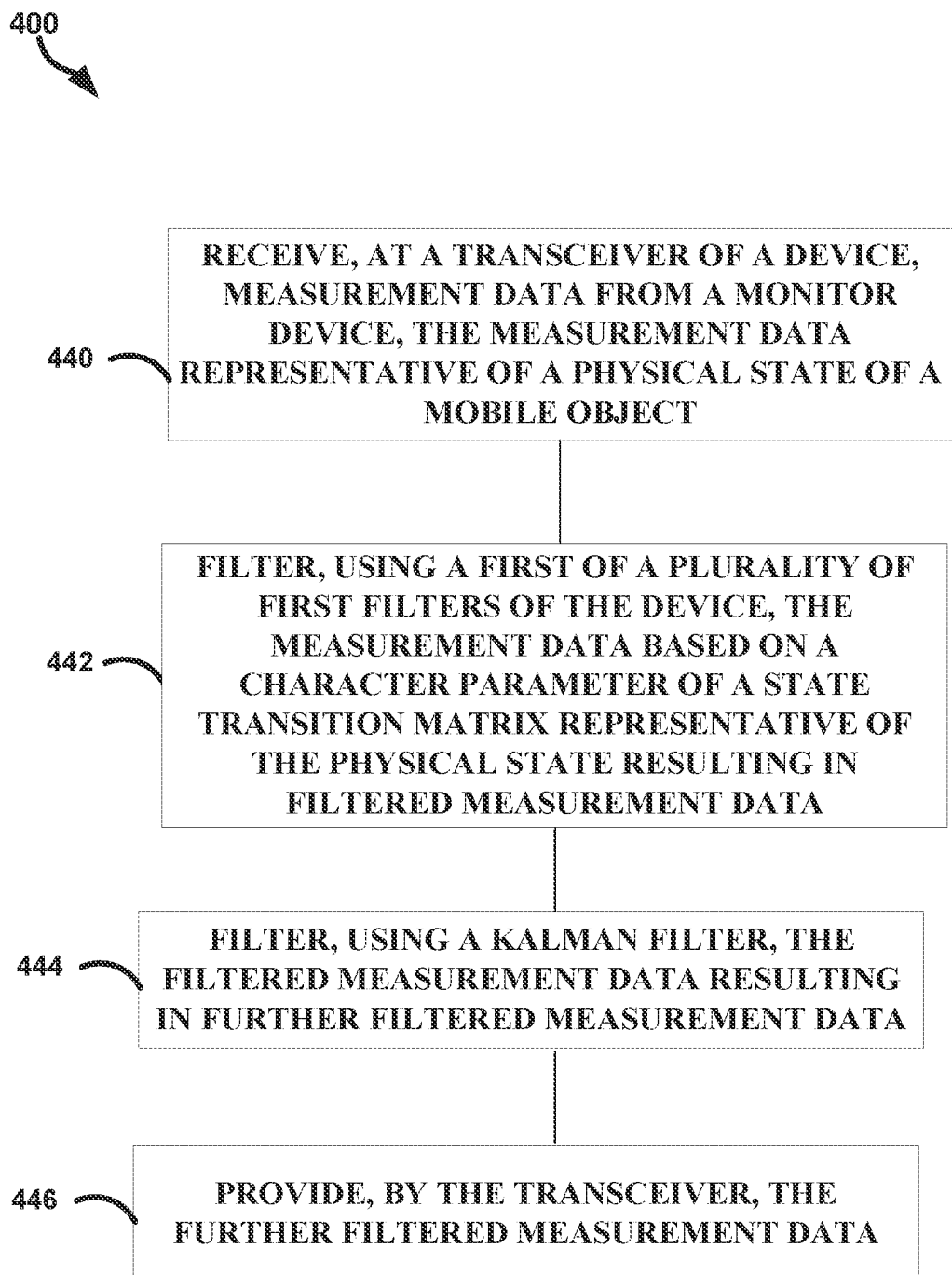
FIG. 4 illustrates, by way of example, a diagram of an embodiment of a method for more accurate satellite position determination.

FIG. 4 illustrates, by way of example, a diagram of an embodiment of a method 400 for more accurate satellite position determination. The method 400 as illustrated includes receiving, at a transceiver of a device, measurement data from a monitor device, the measurement data representative of a physical state of a mobile object, at operation 440; filtering, using a first of a plurality of first filters of the device, the measurement data based on a character parameter of a state transition matrix representative of the physical state resulting in filtered measurement data, at operation 442; filtering, using a Kalman filter, the filtered measurement data resulting in further filtered measurement data, at operation 444; and providing, by the transceiver, the further filtered measurement data, at operation 446. The plurality of filters include a low pass filter, a wavelet filter, and a moving average filter. The low pass filter can be applied when the character parameter of the state matrix satisfies a first criterion, the wavelet filter can be applied when the character parameter of the state matrix satisfies a second criterion, and the moving average filter can be applied when the character parameter satisfies a third criterion. The character parameter can be determined based on a trace and an antitrace of the state transition matrix.

The method 400 can further include adjusting a size of the state transition matrix based on a measure of order within the received measurement data. The method 400 can further include adjusting the size of the state transition matrix based on a pseudorandom number. The method 400 can further include, wherein the measurement data is an ephemeris sequence, $A_k$, that is filtered using a low-order polynomial filter. The method 400 can further include filtering Ak responsive to determining the measure of order is within a specified threshold of a target measure of order.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium (e.g., Storage Device)

Figure 5:
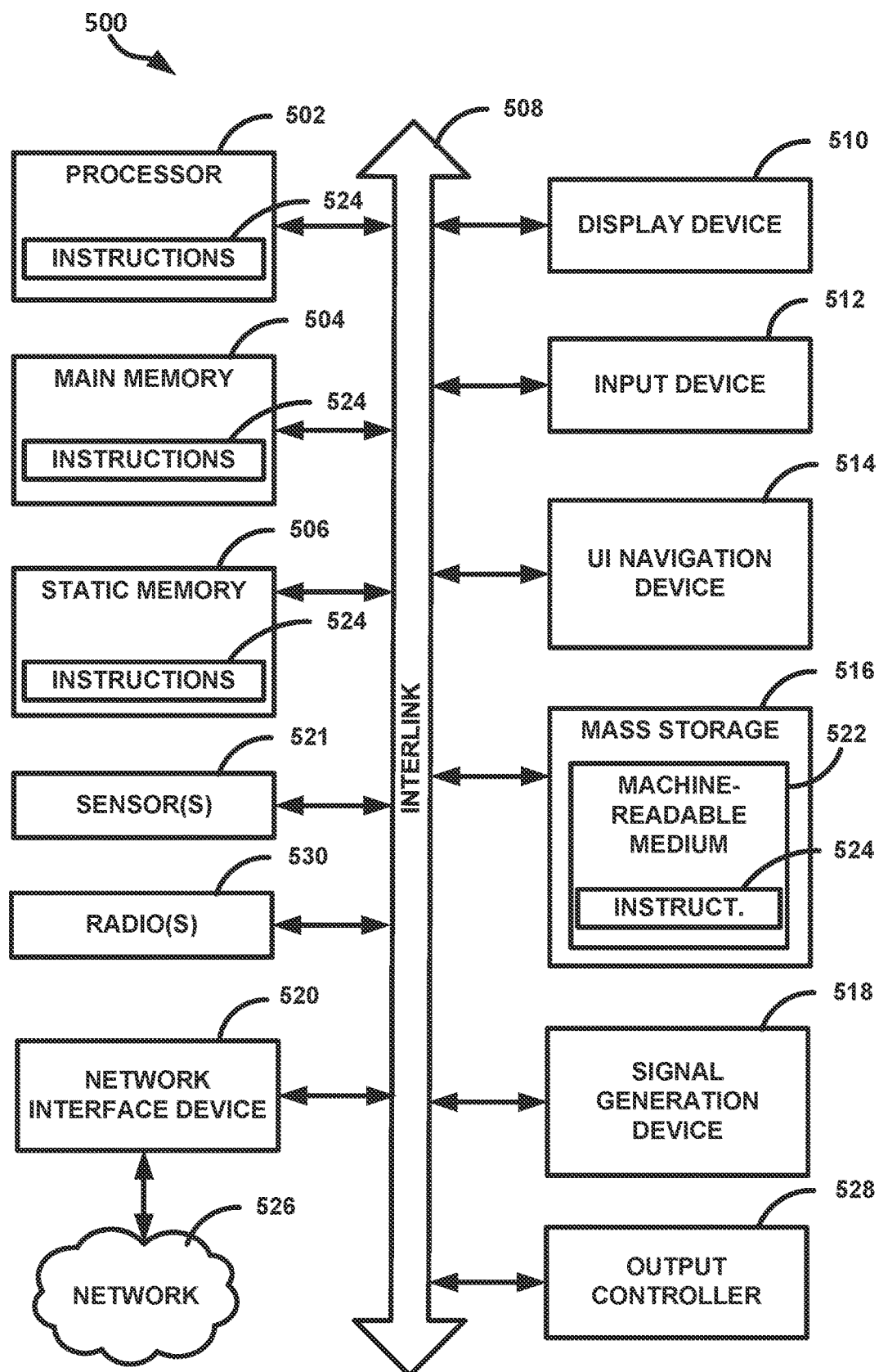
FIG. 5 illustrates, by way of example, a block diagram of an embodiment of a machine in the example form of a computer system within which instructions, for causing the machine to perform any one or more of the methodologies discussed herein, may be executed.

FIG. 5 illustrates, by way of example, a block diagram of an embodiment of a machine in the example form of a computer system 500 within which instructions, for causing the machine to perform any one or more of the methodologies discussed herein, may be executed. One or more of can be implemented or performed by the computer system 500. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 521 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 504 and a static memory 506, which communicate with each other via a bus 508. The memory 504, 506 can store parameters (sometimes called weights) that define operations of the processing circuitry 118, monitor 106, or other component of the system 500. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), a network interface device 520, and radios 530 such as Bluetooth, WWAN, WLAN, and NFC, permitting the application of security controls on such protocols.

The machine 500 as illustrated includes an output controller 528. The output controller 528 manages data flow to/from the machine 500. The output controller 528 is sometimes called a device controller, with software that directly interacts with the output controller 528 being called a device driver.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504, the static memory 506, and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL EXAMPLE

Example 1 can include a device comprising a transceiver configured to receive measurement data from a monitor device, the measurement data representative of a physical state of a mobile object, processor circuitry configured to filter, using a first of a plurality of first filters, the measurement data based on a character parameter of a state transition matrix representative of the physical state resulting in filtered measurement data, and filter, using a Kalman filter, the filtered measurement data resulting in further filtered measurement data, wherein the transceiver is further configured to provide the further filtered measurement data.

In Example 2, Example 1 can further include, wherein the plurality of filters include a low pass filter, a wavelet filter, and a moving average filter.

In Example 3, Example 2 can further include, wherein the low pass filter is applied when the character parameter of the state matrix satisfies a first criterion, the wavelet filter is applied when the character parameter of the state matrix satisfies a second criterion, and the moving average filter is applied when the character parameter satisfies a third criterion.

In Example 4, Example 3 can further include, wherein the character parameter is determined based on a trace and an antitrace of the state transition matrix.

In Example 5, at least one of Examples 1-4 can further include, wherein the processor circuitry is further configured to adjust a size of the state transition matrix based on a measure of order within the received measurement data.

In Example 6, Example 5 can further include, wherein the processor circuitry is further configured to adjust the size of the state transition matrix based on a pseudorandom number.

In Example 7, at least one of Examples 5-6 can further include, wherein the measurement data is an ephemeris sequence $A_k$, that is filtered using a low-order polynomial filter.

In Example 8, Example 7 can further include, wherein the processor circuitry is configured to further filter Ak responsive to determining the measure of order is within a specified threshold of a target measure of order.

Example 9 includes a method comprising receiving, at a transceiver of a device, measurement data from a monitor device, the measurement data representative of a physical state of a mobile object, filtering, using a first of a plurality of first filters of the device, the measurement data based on a character parameter of a state transition matrix representative of the physical state resulting in filtered measurement data, filtering, using a Kalman filter, the filtered measurement data resulting in further filtered measurement data, and providing, by the transceiver, the further filtered measurement data.

In Example 10, Example 9 can further include, wherein the plurality of filters include a low pass filter, a wavelet filter, and a moving average filter.

In Example 11, Example 10 can further include, wherein the low pass filter is applied when the character parameter of the state matrix satisfies a first criterion, the wavelet filter is applied when the character parameter of the state matrix satisfies a second criterion, and the moving average filter is applied when the character parameter satisfies a third criterion.

In Example 12, Example 11 can further include, wherein the character parameter is determined based on a trace and an antitrace of the state transition matrix.

In Example 13, at least one of Examples 9-12 can further include adjusting a size of the state transition matrix based on a measure of order within the received measurement data.

In Example 14, Example 13 can further include adjusting the size of the state transition matrix based on a pseudorandom number.

In Example 15, at least one of Examples 13-14 can further include, wherein the measurement data is an ephemeris sequence, $A_k$, that is filtered using a low-order polynomial filter.

In Example 16, Example 15 can further include, filtering Ak responsive to determining the measure of order is within a specified threshold of a target measure of order.

Example 17 includes a (e.g., non-transitory) machine-readable medium including instructions that, when executed by a machine, cause the machine to perform the method of one of Examples 9-16.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A device comprising:
a transceiver configured to receive measurement data from a monitor device, the measurement data representative of a physical state of a mobile object;
processor circuitry configured to:
filter, using a first of a plurality of first filters including at least two of a low pass filter, a wavelet filter, or a moving average filter, the measurement data based on a character parameter of a state transition matrix representative of the physical state resulting in filtered measurement data; and
filter, using a Kalman filter, the filtered measurement data resulting in further filtered measurement data;
wherein the transceiver is further configured to provide the further filtered measurement data.

2. The device of claim 1, wherein the plurality of filters include a low pass filter, a wavelet filter, and a moving average filter.

3. The device of claim 2, wherein the low pass filter is applied when the character parameter of the state matrix satisfies a first criterion, the wavelet filter is applied when the character parameter of the state matrix satisfies a second criterion, and the moving average filter is applied when the character parameter satisfies a third criterion.

4. The device of claim 3, wherein the character parameter is determined based on a trace and an antitrace of the state transition matrix.

5. The device of claim 1, wherein the processor circuitry is further configured to adjust a size of the state transition matrix based on a measure of order within the received measurement data.

6. The device of claim 5, wherein the processor circuitry is further configured to adjust the size of the state transition matrix based on a pseudorandom number.

7. The device of claim 5, wherein the measurement data is an ephemeris sequence, $A_k$, that is filtered using a low-order polynomial filter.

8. The device of claim 7, wherein the processor circuitry is configured to filter Ak responsive to determining the measure of order is within a specified threshold of a target measure of order.

9. The device of claim 8, wherein the measure of order is both a detective of generative grammar and a measure of the generative grammar in an output signal of a fuzzy genetic learning automaton.

10. A method comprising:
receiving, at a transceiver of a device, measurement data from a monitor device, the measurement data representative of a physical state of a mobile object;
filtering, using a first of a plurality of first filters of the device where the first filters include at least two of a low pass filter, a wavelet filter, or a moving average filter, the measurement data based on a character parameter of a state transition matrix representative of the physical state resulting in filtered measurement data;
filtering, using a Kalman filter, the filtered measurement data resulting in further filtered measurement data; and
providing, by the transceiver, the further filtered measurement data.

11. The method of claim 10, wherein the plurality of filters include a low pass filter, a wavelet filter, and a moving average filter.

12. The method of claim 11, wherein the low pass filter is applied when the character parameter of the state matrix satisfies a first criterion, the wavelet filter is applied when the character parameter of the state matrix satisfies a second criterion, and the moving average filter is applied when the character parameter satisfies a third criterion.

13. The method of claim 12, wherein the character parameter is determined based on a trace and an antitrace of the state transition matrix.

14. The method of claim 10, further comprising adjusting a size of the state transition matrix based on a measure of order within the received measurement data.

15. The method of claim 14, further comprising adjusting the size of the state transition matrix based on a pseudorandom number.

16. The method of claim 14, wherein the measurement data is an ephemeris sequence, $A_k$, that is filtered using a low-order polynomial filter.

17. The method of claim 16, further comprising filtering Ak responsive to determining the measure of order is within a specified threshold of a target measure of order.

18. A non-transitory machine-readable medium including instructions that, when executed by a machine, cause the machine to perform operations comprising:
receiving measurement data from a monitor device, the measurement data representative of a physical state of a mobile object;
filtering, using a first of a plurality of first filters of the device where the first filters include at least two of a low pass filter, a wavelet filter, or a moving average filter, the measurement data based on a character parameter of a state transition matrix representative of the physical state resulting in filtered measurement data;
filtering, using a Kalman filter, the filtered measurement data resulting in further filtered measurement data; and
providing the further filtered measurement data.

19. The non-transitory machine-readable medium of claim 18, wherein the plurality of filters include a low pass filter, a wavelet filter, and a moving average filter.

20. The non-transitory machine-readable medium of claim 19, wherein the low pass filter is applied when the character parameter of the state matrix satisfies a first criterion, the wavelet filter is applied when the character parameter of the state matrix satisfies a second criterion, and the moving average filter is applied when the character parameter satisfies a third criterion and wherein the character parameter is determined based on a trace and an antitrace of the state transition matrix.

* * * * *